July 3, 1923.                                                                1,460,715

A. J. GRANBERG

LIQUID METER

Filed April 14, 1919                          2 Sheets-Sheet 1

WITNESS
J H Morgan

INVENTOR
A. J. Granberg.
BY White & Prost
his ATTORNEYS

July 3, 1923.

A. J. GRANBERG

LIQUID METER

Filed April 14, 1919

WITNESS
J. H. Morgan

INVENTOR
A. J. Granberg.
BY White & Prost
his ATTORNEYS

Patented July 3, 1923.

1,460,715

UNITED STATES PATENT OFFICE.

ALBERT J. GRANBERG, OF SAN FRANCISCO, CALIFORNIA, ASSIGNOR TO THE GRANBERG METER COMPANY, OF SAN FRANCISCO, CALIFORNIA, A CORPORATION OF CALIFORNIA.

LIQUID METER.

Application filed April 14, 1919. Serial No. 289,962.

*To all whom it may concern:*

Be it known that I, ALBERT J. GRANBERG, a citizen of the United States, and a resident of the city and county of San Francisco and State of California, have invented a certain new and useful Liquid Meter, of which the following is a specification.

The invention relates to liquid meters for measuring a flowing stream of liquid.

An object of the invention is to provide a liquid meter suitable for metering liquid under pressure.

Another object of the invention is to provide a liquid meter which may be readily adjusted to cause it to meter correctly in the event that it is out of correct adjustment.

A further object of the invention is to provide an adjustable liquid meter in which the adjustment does not interfere with the proper and quiet operation of the meter.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one specific form of meter of my invention, but it is to be understood that I do not limit myself to such form, since the invention, as expressed in the claims, may be embodied in a plurality of forms.

Referring to said drawings.

Figure 1:
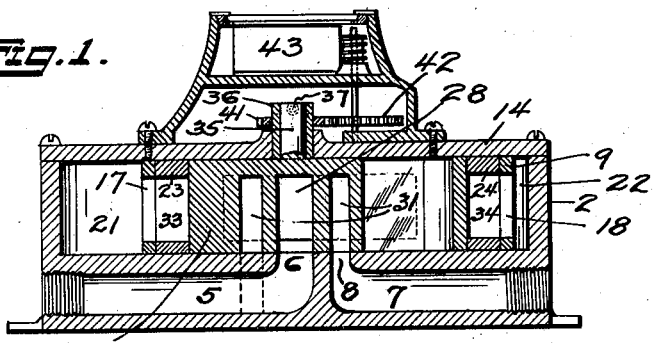
Figure 1 is a vertical longitudinal section through one form of meter of my invention.
Figure 2:
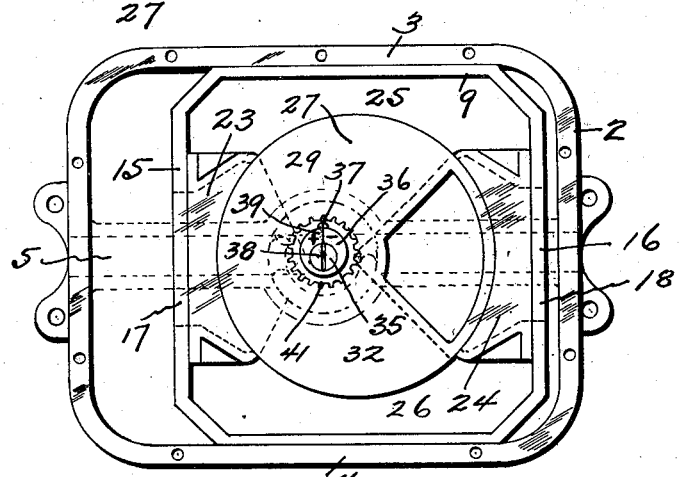
Figure 2 is a plan view of the meter with the cover plate removed.
Figure 3:
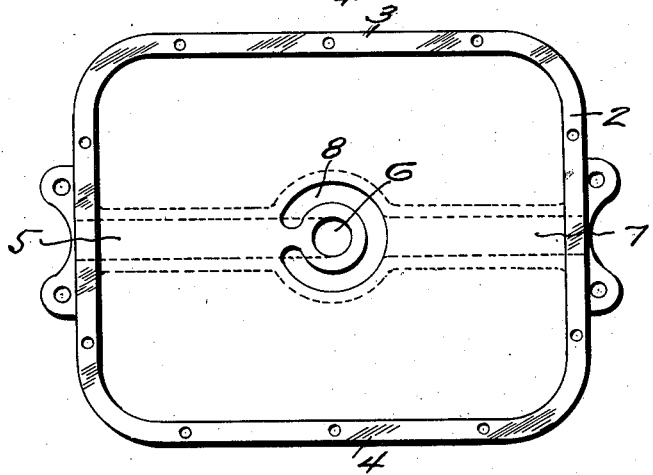
Figure 3 is a plan view of the casing showing the inlet and outlet ports.

The meter of my invention comprises a casing 2, preferably formed of metal and provided with parallel opposite walls 3—4. Formed in the bottom of the casing is an inlet conduit 5 terminating in an inlet port 6 disposed at substantially the center of the bottom and an outlet conduit 7 terminating in an outlet port 8 which is substantially annular in shape and which surrounds and is spaced from the inlet port.

Disposed within the casing and forming a sliding joint with the parallel walls 3—4 is an outer frame 9, which is shorter than the casing, so that it is capable of a limited longitudinal movement with respect thereto. The top of the frame is flush with the top of the walls of the casing, so that it forms a sliding joint with the cover plate 14 secured to the casing. The end walls 15—16 of the frame are parallel to each other and are provided centrally with ports 17—18 to permit the flow of liquid into and out of the chambers 21—22 formed in the casing between the ends of the casing and the frame walls 15 and 16 respectively.

Figure 5:
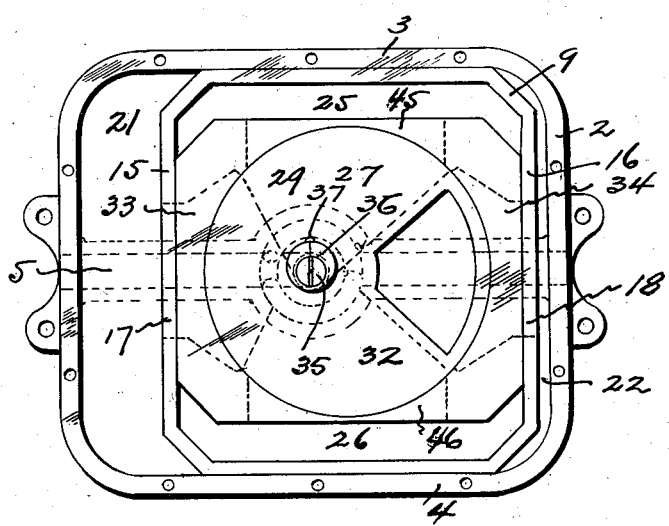
Figure 5 is a plan view of the casing with the cover removed, showing a modified form of construction.

Slidable transversely in the frame and in sliding contact with the parallel walls 15 and 16 thereof is a slide formed of the two slide pieces 23—24 which may be formed separately or which may be formed in one piece, as shown in Figure 5. Since the parts 23—24 operate together they will hereinafter be referred to as the slide piece 23—24. The slide piece is of less width than the frame thus forming the chambers 25—26 within the frame, and is provided with parallel end walls which make sliding contact with the parallel walls 15—16 of the frame.

Journaled eccentrically in the cover plate 14 and fitting within and making sliding contact with the slide is a circular rotatable meter head 27, preferably metallic, which is rotated by the liquid passing through the meter. The meter head is of the same height as the casing wall, so that it forms a sliding joint with the cover plate 14, and is provided with an inlet port 28 which registers with the inlet port 6 in the casing. The meter head is further provided with a flaring inlet passage 29 communicating with the inlet port 28 and opening on the side of the meter head; in the present construction the passage 29 being shown as spanning an arc of about 90° on the periphery of the head. The meter head is also provided with an annular outlet port 31, extending over an arc of approximately 180°, which is constantly in communication with the outlet port 8 in the casing. The meter head is further provided with a flaring outlet passage 32 communicating with the outlet port 31 and opening on the side of the meter head, preferably diametrically opposite the peripheral opening of the inlet passage 29. In the present construction, the opening of the outlet passage 32 spans an arc of approximately 90° on the periphery of the meter head. The remaining portion of the periphery of the meter head, or that portion between the passage openings, presents an imperforate surface. The slide 23—24 is provided on opposite ends with passages 33—34, communicating with the ports 17—18 in the frame and opening on the meter head seat. When the slide is formed in two pieces the passages 29—32 open directly into the chambers 25 and 26 respectively as the meter head rotates, and when the slide is formed in one piece, as shown in Fig. 5, ports 45—46 are provided in the longitudinal walls of the slide to provide communication between the passages and the chambers.

Figure 4:
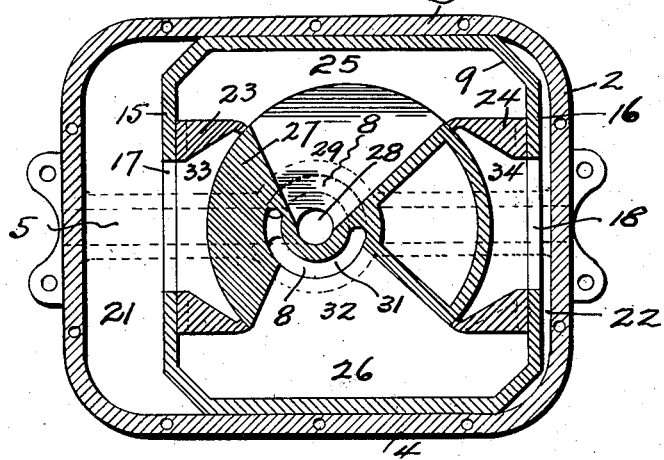
Figure 4 is a longitudinal horizontal section through the meter.

With the parts in the positions shown in Figure 4 and liquid flowing through the meter, the liquid flows from the inlet port through the port 28 into the chamber 25 and from the chamber 26 through the port 31 to the outlet port. The pressure of the incoming liquid forces the slide in a direction to decrease the volume of chamber 26, expelling the liquid from the chamber 26 through the outlet port. This causes a rotation of the meter head in a clockwise direction, bringing the inlet passage 29 into communication with the passage 34, permitting liquid to flow into chamber 22. The pressure of this liquid forces the frame 9 to the left, causing the liquid in the chamber 21 to discharge into the outlet passage 32, which opened to the passage 33 at the same time that the inlet passage opened to chamber 22. Further rotation of the meter head, caused by the liquid pressure, establishes communication successively between the inlet passage 29 and the successive variable-sized chambers 26, 21, 25 and 22 and similarly the outlet passage 32 is successively opened to these chambers. When the meter is in operation, liquid is continuously flowing into one chamber and out of another chamber and at times is flowing into two chambers and out of two chambers, causing a rotation of the meter head about its eccentric journal. This rotary motion of the meter head is continuous while liquid is flowing, and on account of the positions of the various ports and passages, there is no dead center of motion of the meter head.

The amount of liquid passing through the meter at each revolution of the meter head is equal to the amount of liquid displaced from the four chambers 21—25, 22 and 26 by the reciprocating movement of the slide and frame, and this amount depends upon the stroke of reciprocation, or on the eccentricity of the meter head. In order that the meter may be adjusted to pass a different quantity of liquid per revolution of the meter head, means are provided for varying the eccentricity of the meter head, to thereby vary the length of the stroke of the frame and slide. Since the volume discharged from four chambers is varied by this adjustment, the amount of the adjustment need only be small to produce a material variation in the amount of liquid passed per revolution of the meter head. This feature of adjustment is particularly advantageous, since it permits the meter to be accurately adjusted after it is assembled and permits it to be adjusted from time to time during its use, in the event that wear or use should cause it to meter improperly.

The eccentricity of the meter head is varied by surrounding the pin or projection 35 an the head with an eccentric bushing 36, which forms the journal about which the head rotates. The eccentric bushing 36 is clamped to the pin 35 by a set screw 37 or other suitable means, and by loosening the screw, the bushing may be rotated partially with respect to the pin, thereby varying the eccentricity of rotation of the meter head. The pin 35 may be provided on its end with a groove 38 and the bushing may be provided with a mark 39 so that the amount of adjustment may be noted. The bushing may be provided on opposite sides of the mark 39 with plus and minus signs indicating that a movement of the bushing in one direction with respect to the pin will increase the volume of liquid passed per revolution, and a movement in the opposite direction will decrease the amount of liquid passed per revolution.

Secured to the bushing 36 is a gear 41 arranged in mesh with the driving gear 42 of the registering or indicating mechanism enclosed in the case 43, for registering the amount of liquid passed through the meter.

I claim:

1. A liquid meter comprising a casing having inlet and outlet ports, a reciprocating frame in the casing adapted to be reciprocated by the passage of liquid, a meter head adapted to be rotated about an axis eccentric to its axis of figure, operatively connected with said frame so that reciprocation of said frame causes rotation of said head about said eccentric axis and means for varying the distance between the axis of rotation and the axis of figure.

2. A liquid meter comprising a casing having inlet and outlet ports, slidable means in such casing dividing the casing into two chambers, rotatable means for controlling the supply and discharge of liquid to and from said chambers, means interposed between the sliding means and the rotatable means so that reciprocation of the sliding means causes rotation of the controlling means, means for varying the position of the controlling means with respect to the sliding means whereby the stroke of the sliding means is varied, and registering means operated by the rotation of the controlling means.

3. A liquid meter comprising a casing having inlet and outlet ports, a frame slidable in said casing and forming a sliding joint with opposite walls thereof, a second frame slidable in said first frame, a circular meter head arranged within said second frame having passages in continual communication with said inlet and outlet port, an eccentric pin on said meter head, and an eccentric bushing secured to said pin and journaled in said casing.

4. A liquid meter comprising a casing having inlet and outlet ports, a frame slidable longitudinally in said casing in contact with the longitudinal walls thereof, a slide slidable transversely in said frame in contact with the transverse walls thereof, a circular meter head rotatable about an axis eccentric to its axis of figure and disposed within and forming a sliding contact with said slide, and means for varying the eccentricity of movement of said head.

5. A liquid meter comprising a casing having inlet and outlet ports, a frame slidable longitudinally in said frame in contact with the longitudinal walls thereof, a slide slidable transversely in said frame in contact with the transverse walls thereof, a meter head rotatable about an axis eccentric to its axis of figure and disposed within and forming a sliding contact with said slide, and registering means operated by the movement of said head.

6. A liquid meter comprising a casing having inlet and outlet ports, a frame slidable longitudinally in said frame in contact with the longitudinal walls thereof, a slide slidable transversely in said frame in contact with the transverse walls thereof, and a meter head rotatable about an axis eccentric to its axis of figure and disposed within and forming a sliding contact with said slide, said meter head being provided with passages communicating at one end with the inlet and outlet ports and opening at the other end on the periphery of the meter head at diametrically opposite points.

7. A liquid meter comprising a casing having inlet and outlet ports, a frame slidable longitudinally in said frame in contact with the longitudinal walls thereof, the transverse walls of the frame being provided with ports, a four-sided slide slidable transversely in said frame in contact with the transverse walls thereof, said slide being provided with ports extending through the four sides thereof, a meter head rotatable about an axis eccentric to its axis of figure and disposed in said slide and forming a sliding contact therewith, said head being provided with passages adapted to establish communication alternately between the ports in the slide and the inlet and outlet ports, and registering means operated by the rotation of the head.

8. A liquid meter comprising a chambered casing having inlet and outlet ports, a slide frame in said chamber, a slide in said frame and a meter head rotatable about an axis eccentric to its axis of figure and slidably arranged within said slide and provided with passages in continual communication with said inlet and outlet ports respectively.

9. A liquid meter comprising a casing having inlet and outlet ports, a frame slidable longitudinally in said casing in contact with the longitudinal walls thereof and having ports in its transverse walls, a slide slidable transversely in said frame in contact with the transverse walls thereof, a circular meter head journaled in said casing on an axis eccentric to its axis of figure and arranged within and forming a sliding contact with said slide, said slide being open on its longitudinal sides and being provided on its transverse sides with ports communicating with the ports in the transverse walls of the frame, said meter head being provided with passages opening on the periphery of the head and communicating respectively with the inlet and outlet ports, said passages at the periphery of the head being spaced apart angularly by imperforate walls which form tight sliding joints with the slide, and registering means operated by the rotation of said head.

10. A liquid meter comprising a casing having inlet and outlet ports, a frame slidable longitudinally in said casing in contact with the longitudinal walls thereof and having ports in its transverse walls, a slide slidable transversely in said frame in contact with the transverse walls thereof, a circular meter head journaled in said casing on an axis eccentric to its axis of figure and arranged within and forming a sliding contact with said slide, said slide being open on its longitudinal sides and being provided on its transverse sides with ports communicating with the ports in the transverse walls of the frame, said meter head being provided with passages opening on the periphery of the head and communicating respectively with the inlet and outlet ports, said passages at the periphery of the head being spaced apart angularly by imperforate walls which form tight sliding joints with the slide, an eccentric pin on said meter head, an eccentric bushing secured to said pin and journaled in the casing, and registering means connected to said bushing.

11. A liquid meter comprising a casing having inlet and outlet ports, a frame slidable in said casing and forming a sliding joint with the opposite walls of the casing, a second frame slidable in said first frame, a meter head arranged within said frame and adapted to be moved in a circle by the passage of liquid thru the meter, and means for varying the radius of said circle.

12. In a liquid meter, a meter head arranged to move about an axis eccentric to its axis of figure and means for varying the distance between said axes.

13. A liquid meter comprising a casing having inlet and outlet ports, a sliding frame in said casing dividing the casing into two chambers, a meter head arranged within said frame and controlling communication between the chambers and the inlet and outlet ports, means operated by the passage of liquid thru the meter and cooperating with said slide frame for moving the meter head in a circle and means for varying the amount of reciprocation of said frame.

14. A liquid meter comprising a casing having inlet and outlet ports, slidable means in said casing dividing the casing into two liquid receiving chambers, the volumes of which chambers are varied by movement of said slidable means, a meter head cooperating with said means, means operated by the passage of liquid thru the meter and cooperating with said slide frame for moving the meter head in a circular path and means for varying the radius of said circular path.

15. A liquid meter comprising a casing having inlet and outlet ports, slidable means in said casing dividing the casing into two liquid receiving chambers, the volumes of which chambers are varied by movement of said slidable means, a meter head cooperating with said means, means operated by the passage of liquid thru the meter and cooperating with said slide frame for moving the meter head in a circular path and means for varying the amount of reciprocation of said slidable means.

16. A liquid meter comprising a casing having inlet and outlet ports, slidable means in said casing dividing the casing into two chambers, means for controlling the supply and discharge of liquid to and from said chambers so that the slidable means is reciprocated and the controlling means operated and means for varying the position of the controlling means with respect to the sliding means whereby the stroke of the sliding means is varied.

17. In a liquid meter, two reciprocable members adapted to be reciprocated in paths at right angles to each other by the passage of liquid thru the meter, means for converting the reciprocable motion of said members into a motion of rotation, means for registering the motion of rotation and means for varying the extent of the motion of reciprocation of said members.

18. In a liquid meter, means adapted to be reciprocated by the passage of liquid through the meter, a member adapted to be moved in a circle about an axis eccentric to its axis of figure by said reciprocating means, means for registering the rotation of said member and means for varying the distances between said axes to control the extent of the motion of reciprocation.

19. In a liquid meter, means adapted to be reciprocated by the passage of liquid thru the meter, a register operated by the reciprocation of said means, and rotatable means for transmitting motion from said reciprocable means to the register, said rotatable means being adjustable to vary the extent of the motion of reciprocation.

20. In a liquid meter, means adapted to be reciprocated by the passage of liquid thru the meter, registering means, rotatable means for transmitting motion from the reciprocable means to the registering means, and means for adjusting the rotatable means to vary the radius of the path of movement of the rotatable means.

In testimony whereof, I have hereunto set my hand at San Francisco, California, this 4th day of April, 1919.

ALBERT J. GRANBERG.

In presence of—
H. G. Prost.